UNITED STATES PATENT OFFICE.

HENRY G. DAYTON, OF MAYSVILLE, KENTUCKY.

IMPROVEMENT IN DISINFECTING-POWDERS.

Specification forming part of Letters Patent No. 141,546, dated August 5, 1873; application filed July 11, 1873.

*To all whom it may concern:*

Be it known that I, HENRY G. DAYTON, of Maysville, in the county of Mason and State of Kentucky, have invented a new and valuable Improvement in Insect and Disinfecting Powder; and I do hereby declare that the following is a full, clear, and exact description of the operation of the same.

My invention relates to that class of powders intended to destroy vermin and disinfect offensive decomposing substances; and it consists in the novel combination of the powder of marble and white sand, as hereinafter described, to form a base for the volatile distillate of coal-tar.

My powder is prepared as follows, to wit: I take of powdered marble two parts, and of clean white sand one part, and mix them thoroughly together. I next add of the volatile distillate of coal-tar a sufficient quantity to impart to the mixture such strength of odor as may be required, being careful always that the quantity shall not be so great as to make the powder clammy or wet.

If the powder be designed for perfuming chests or bureaus of clothing to kill or drive away insects, or to scatter upon carpets for a like purpose, the amount of distillate used should be less than when designed for use as a deodorizer. As a disinfectant the quantity of the distillate need not be limited to any particular standard.

The amount of marble-dust and sand herein stated may be varied somewhat, but the proportions given I believe to be well adapted for the purpose mentioned. After the distillate is added the compound is thoroughly mixed.

The powder thus prepared may be used upon any article of clothing without imparting to it anything but the odor. The marble-dust and clean white sand, even when the distillate is added, do not soil the most delicate fabric.

This powder will kill insects with great rapidity, while for disinfecting sick-rooms it has no superior. It may be used in safes, cupboards, and other like receptacles, by sprinkling into the crevices, when its odor will remain for a great period of time, and serve to prevent decomposition of meats and vegetables.

What I claim as my invention, and desire to secure by Letters Patent, is—

The combination of powdered marble and white sand, as described, to form a base for the distillate of coal-tar, substantially as and for the purpose specified.

In testimony that I claim the above I have hereunto subscribed my name in the presence of two witnesses.

HENRY G. DAYTON.

Witnesses:
PHIL C. MASI,
GEO. E. UPHAM.